B. HOTCHKISS.
Thill Coupling.
No. 98,499. Patented Jan. 4, 1870.
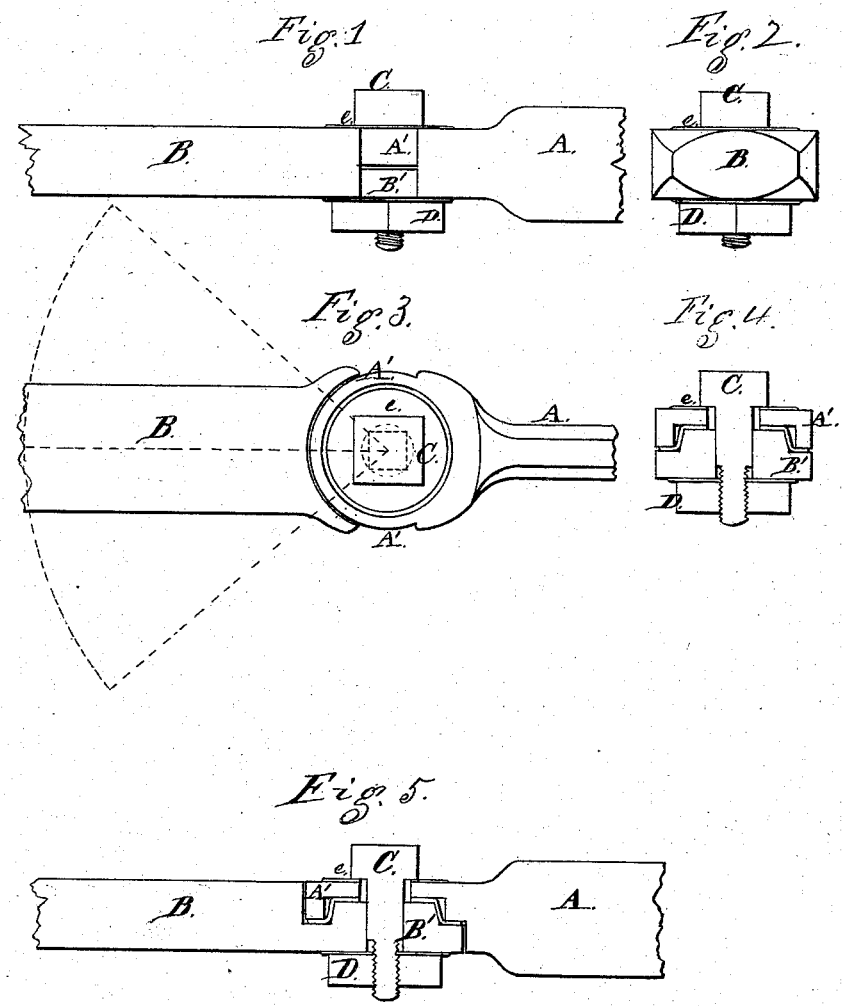

United States Patent Office.

BENNET HOTCHKISS, OF FAIR HAVEN, ASSIGNOR TO HIMSELF AND W. J CLARK & CO., OF SOUTHINGTON, CONNECTICUT.

Letters Patent No. 98,499, dated January 4, 1870.

IMPROVEMENT IN THILL-COUPLINGS.

The Schedule referred to in these Letters Patent and making part of the same.

*To all whom it may concern:*

Be it known that I, BENNET HOTCHKISS, of Fair Haven, in the county of New Haven, State of Connecticut, have invented certain new and useful Improvements in the Construction of Couplings or Joints, intended more particularly for connecting shafts or thills to the front axles of carriages; and I do hereby declare that the following is a full and exact description thereof.

I will first describe what I consider the best means of carrying out my invention, and will afterward designate the points which I believe to be new therein.

The accompanying drawings form a part of this specification.

Figure 1 is an edge view of the joint, with a short length of the parts which are connected thereby.

Figure 2 is an end view of the same.

Figure 3 is a side view of the joint, the dotted lines showing the extent to which the joint may be turned.

Figure 4 is a cross-section, through the centre of the joint.

Figure 5 is a longitudinal section through the joint and through the adjacent parts.

Similar letters of reference indicate like parts in all the figures.

A and B are the parts which are to be joined together. The part A, in this figure, is intended to be screwed firmly to the axle of the carriage, by means of the ordinary clips or otherwise. The part B is screwed to the thills or shafts in any approved manner.

C is the bolt or pin, which receives a nut, D, as represented.

A washer, $e$, is interposed under the head of the screw, and another under the nut, as represented.

The part A is extended in a circular form, as indicated by A′, and is recessed, as indicated, to admit a corresponding projection or part, B′, which extends into it from the correspondingly-rounded portion of the part B.

A washer of leather or other suitable soft material, adapted to retain the lubricating-matter, and to lessen friction, as also to prevent rattling or noise, is stamped, pressed, or otherwise formed into a suitable shape, to allow it to fit between the parts, as represented.

The hole in the part A′ is round; the hole in the part B′ is square. The shank of the bolt C is square, and fits tightly into a hole in the part B′. The round hole in the part A is of sufficient size to turn freely around the square bolt.

The construction of my joint, by taking the strain on the parts A′ and B′, in the manner represented, relieves the bolt C from draught. It is not necessary that the part A′ touch the bolt C at all, except under the head.

The fitting of the square shank of the bolt C into the square hole in the part B′, holds the bolt against turning, and, consequently, working loose in using. The working of the joint occasions no friction or tendency of the bolt to turn in the nut.

The large part of the bolt may be made longer, so that the nut D may be screwed down tight against it if necessary, or if there is a tendency of the nut to work loose.

I can make the parts A and B of wrought-iron or steel, either plain or galvanized, plated, japanned, or otherwise prepared, using dies properly shaped to form the accurately-fitting parts; or they may be roughly shaped by such means, and may be finished cold by machinery or otherwise.

The metals may be the same or of different characters. Malleable cast-iron or any other approved material may be used with some success.

Having now fully described my invention,

What I claim as new, and desire to secure by Letters Patent, is—

The construction of a coupling, as herein described, and as shown in figs. 4 and 5, the part A A′ matching and partially enclosing the part B′, as shown in said figures, the two being held together by means of the square bolt C fitting tightly the socket in part B′, and passing loosely through an enlarged opening in the part A′, all constructed, arranged, and operating substantially as specified.

BENNET HOTCHKISS.

Witnesses:
C. C. LIVINGS,
MARION A. DOWD.